United States Patent
Sakurada et al.

(10) Patent No.: US 9,616,604 B2
(45) Date of Patent: Apr. 11, 2017

(54) INJECTION DEVICE HAVING TWO-PIECE NOZZLE, JIG FOR USE IN ASSEMBLING TWO-PIECE NOZZLE, AND METHOD OF ASSEMBLING TWO-PIECE NOZZLE

(71) Applicant: NISSEI PLASTIC INDUSTRIAL CO., LTD., Hanishina-gun, Nagano (JP)

(72) Inventors: Yuichi Sakurada, Nagano (JP); Toshimi Kato, Nagano (JP)

(73) Assignee: NISSEI PLASTIC INDUSTRIAL CO., LTD. (JP)

( * ) Notice: Subject to any disclaimer, the term of this patent is extended or adjusted under 35 U.S.C. 154(b) by 0 days.

(21) Appl. No.: 14/672,844

(22) Filed: Mar. 30, 2015

(65) Prior Publication Data

US 2015/0298377 A1    Oct. 22, 2015

(30) Foreign Application Priority Data

Apr. 17, 2014 (JP) ................. 2014-085781

(51) Int. Cl.
| | |
|---|---|
| B29C 45/20 | (2006.01) |
| B23P 15/00 | (2006.01) |
| B29C 45/17 | (2006.01) |
| B29C 45/74 | (2006.01) |
| B29C 45/78 | (2006.01) |

(52) U.S. Cl.
CPC .......... B29C 45/20 (2013.01); B23P 15/007 (2013.01); B29C 45/17 (2013.01); B29C 45/74 (2013.01); B29C 45/78 (2013.01); B29C 2945/7604 (2013.01); B29C 2945/7618 (2013.01)

(58) Field of Classification Search
CPC ....... B23P 15/007; B29C 45/17; B29C 45/20; B29C 45/74
See application file for complete search history.

(56) References Cited

U.S. PATENT DOCUMENTS 3,295,169 A * 1/1967 Moslo ................ B29C 45/231
222/504
3,611,504 A * 10/1971 Johnson ................ B29C 45/20
425/150

(Continued)

FOREIGN PATENT DOCUMENTS

| JP | 03-176113 | * 7/1991 |
|---|---|---|
| JP | 529535 | 4/1993 |

(Continued)

OTHER PUBLICATIONS

Whelan, A., Injection Moulding Machines, 1984, Elsevier Applied Science Publishers, pp. 45-49.*

(Continued)

*Primary Examiner* — Jill Heitbrink
(74) *Attorney, Agent, or Firm* — Adams & Wilks

(57) ABSTRACT

An injection device has a heating cylinder, a nozzle adaptor attached to an end of the heating cylinder, a nozzle body attached to an end of the nozzle adaptor, a heater for heating the nozzle body, and a thermocouple for measuring a temperature of the nozzle body. The nozzle body has an outer peripheral surface and a key seat formed in the outer peripheral surface and extending in an axial direction of the nozzle body. The thermocouple includes a plate fitted in the key seat of the nozzle body.

15 Claims, 5 Drawing Sheets

(56) References Cited

U.S. PATENT DOCUMENTS

| | | | | |
|---|---|---|---|---|
| 4,389,002 | A * | 6/1983 | Devellian | B29C 45/20 |
| | | | | 165/104.26 |
| 4,875,845 | A * | 10/1989 | Hara | B29C 45/74 |
| | | | | 264/328.15 |
| 5,753,049 | A * | 5/1998 | Ihara | B29C 45/1753 |
| | | | | 100/112 |
| 6,666,675 | B2 * | 12/2003 | Ihara | B29C 45/27 |
| | | | | 264/328.15 |
| 8,247,739 | B2 * | 8/2012 | Schlipf | B29C 45/1782 |
| | | | | 219/264 |
| 2002/0102323 | A1 | 8/2002 | Ihara et al. | 425/549 |
| 2005/0095313 | A1 * | 5/2005 | Ciccone | B29C 45/27 |
| | | | | 425/569 |

FOREIGN PATENT DOCUMENTS

| | | | |
|---|---|---|---|
| JP | 09-239781 | * | 9/1997 |
| JP | 11-77750 | * | 3/1999 |
| JP | 2002225084 | | 8/2002 |

OTHER PUBLICATIONS

Electronic translation of JP 03-176113.*
Notification of Reasons for Refusal mailed May 24, 2016 in Japanese Patent Application No. P2014-085781 together with partial English-language translation thereof.

* cited by examiner

INJECTION DEVICE HAVING TWO-PIECE NOZZLE, JIG FOR USE IN ASSEMBLING TWO-PIECE NOZZLE, AND METHOD OF ASSEMBLING TWO-PIECE NOZZLE

FIELD OF THE INVENTION

The present invention relates to an injection device having a two-piece nozzle, a jig for use in assembling the two-piece nozzle, and a method of assembling the two-piece nozzle.

BACKGROUND OF THE INVENTION

Injection devices include a nozzle removably connected to the tip of a heating cylinder. In an injection molding process, the nozzle is brought into contact with a molding die and a molten material is injected from the injection device into a cavity of the molding die. The nozzle has design factors, such as an outside diameter, length, and material, which are to be changed depending on the type of the molding die with which the nozzle is used in combination. To meet with this requirement, many different types of nozzle are prepared in advance and one nozzle selected from among the prepared nozzles is threadedly attached to the tip of the heating cylinder.

According to a prior improvement shown in Japanese Patent Publication (JP-B) No. 05-29535, a nozzle adaptor is used, which enables use of several different nozzles in combination with a single heating cylinder.

FIG. 7 hereof shows a general configuration of a heating cylinder head disclosed in JP 05-29535 B. The disclosed heating cylinder head includes a nozzle 101 and a nozzle adaptor 102 that are threadedly connected together. The nozzle adaptor 102 has a pair of diametrically opposite pin holes 103, 103 formed on a front surface thereof. A separately provided handle member 104 includes a central tubular hub 105 having a pair of diametrically opposite pins 106, 106 projecting from one end face of the tubular hub 105 for fitting engagement with the pin holes 103, 103, respectively, and a pair of arms 107 extending radially outwardly from the tubular hub 105 in diametrically opposite directions.

With the pins 106, 106 of the handle member 104 being fitted in the pin holes 103, 103 of the nozzle adaptor 102, the handle member 104 is rotated in a screw tightening direction so that the nozzle adaptor 102 can be screwed onto the tip of a heating cylinder 108. The handle member 104 is a large-sized special jig and, hence, is not easy to store. The nozzle 101 threadedly fastened to the nozzle adaptor 102 can be replaced with another nozzle when necessary. However, JP 05-29535 B has no disclosure or teaching about how and where attachment and detachment of the nozzle 101 relative to the nozzle adaptor 102 is performed. It may be considered that such attachment/detachment of the nozzle 101 relative to the nozzle adaptor 102 is achieved at an assembly site which is provided separately from a molding site and which is furnished with various tools and jigs.

To deal with an increasing demand for a little production of many kinds of molded articles, it is desirable that both attachment/detachment of the nozzle adaptor 102 relative to the tip of the heating cylinder 108 and replacement of the existing nozzle 101 with a different nozzle can be achieved at a molding site without reliance on the use of a large-sized jig.

It may be considered that a nozzle is configured to have a wrench engagement part on its outer peripheral surface so as to facilitate attachment/detachment relative to the nozzle adaptor. However, the wrench engagement part makes it difficult to arrange a heater in such a manner as to surround uniformly over the entire area of the outer peripheral surface of the nozzle. Due to a local low temperature area created by the presence of the wrench engagement part, an appropriate control of the nozzle temperature cannot be achieved.

It is accordingly an object of the present invention to provide an injection device having a two-piece nozzle composed of a nozzle adaptor and a nozzle body which can be assembled and disassembled at a molding site without using a large-sized jig.

Another object of the present invention is to provide a jig for use in assembling and disassembling the two-piece nozzle.

A further object of the present invention is to provide a method of assembling the two-piece nozzle, which is particularly suitable for a little production of many kinds of molded articles.

SUMMARY OF THE INVENTION

According to a first aspect of the present invention, there is provided an injection device comprising: a heating cylinder; a two-piece nozzle composed of a nozzle adaptor threadedly attached to a tip of the heating cylinder and a nozzle body threadedly attached to a tip of the nozzle adaptor, the nozzle adaptor having an outer peripheral wrench-engagement part for being gripped by a wrench; a heater for heating the nozzle body: and a thermocouple for measuring a temperature of the nozzle body, The nozzle body has a key seat formed in an outer peripheral surface thereof and extending in an axial direction thereof.

With this arrangement, since the nozzle body has a key seat formed on an outer peripheral surface thereof, it is possible turn or rotate the nozzle body by using the key seat. Turning of the nozzle body can be achieved by using a general-purpose tool such as a wrench or spanner. The nozzle body can be easily attached to or detached from the nozzle adaptor without using a large-sized special jig. Furthermore, since the nozzle body is not provided with a wrench-engagement part, the heater can be provided on the nozzle body uniformly over the entire region of the outer peripheral surface thereof, which will insure uniform heating of the nozzle body.

Preferably, the nozzle body has an insertion hole extending from a bottom of the key seat in a radial inward direction of the nozzle body, and a longitudinal groove formed in the outer peripheral surface of the nozzle body and extending continuously from an end of the key seat in the axial direction of the nozzle body. The longitudinal groove has a depth smaller than a depth of the key seat, and the thermocouple is received in the longitudinal groove of the nozzle body and has an end portion inserted in the insertion hole. The key seat, which is used for attachment/detachment of the nozzle body relative to the nozzle adaptor, can be also used for attachment of the thermocouple to the nozzle body.

Preferably, the heater comprises a cylindrical heater fitted over the nozzle body and serving as a stopper that prevents the thermocouple from coming off from the key seat and the longitudinal groove of the nozzle body. Thus, the heater doubles in function as a heating means and also as a thermocouple stopper means.

Preferably, the thermocouple includes a rectangular plate fixed to the end portion thereof, the rectangular plate being fitted in the key seat. With the end portion of the thermocouple fixed in position by the rectangular plate fittedly received in the key seat, the thermocouple can be stably mounted on the nozzle body.

According to a second aspect of the present invention, there is provided a jig for use in assembling and disassembling the two-piece nozzle of the foregoing construction. The jig is comprised of a ring-shaped jig member and a key. The ring-shaped jig member has an inner peripheral surface slidably engageable with the outer peripheral surface of the nozzle body, an outer peripheral wrench-engagement part for being gripped by a wrench, and a keyway formed in the inner peripheral surface thereof and extending in an axial direction of thereof, the keyway having a cross-sectional shape corresponding to a cross-sectional shape of the key seat of the nozzle body. The key is fittedly receivable in the key seat of the nozzle body and slidably receivable in the keyway of the ring-shaped jig member. The ring-shaped jig member provided with the key way can be readily key-coupled with the nozzle body via the key. By virtue of the wrench-engagement part of the ring-shaped jig member, the nozzle body which is key coupled with the ring-shaped jig member, can be readily rotated in a screw tightening direction until the threaded end portion of the nozzle body is tightly fastened to the threaded end portion of the nozzle adaptor, by using a general-purpose tool, such as a wrench or spanner in combination with the wrench-engagement part of the ring-shaped jig member. The jig composed of the ring-shaped jig member and the key is small in size, can be produced at a relatively low cost, and requires no special care about its storage space.

According to a third aspect of the present invention, there is provided a method of assembling a two-piece nozzle composed of a nozzle adaptor and a nozzle body, wherein the nozzle adaptor has an outer peripheral wrench-engagement part for being gripped by a first wrench, and a threaded end portion, and the nozzle body has a threaded end portion threadedly engageable with the threaded end portion of the nozzle adaptor, and a key seat formed on an outer peripheral surface thereof and extending in an axial direction thereof. The method comprises the steps of: providing a jig composed of a ring-shaped jig member and a key, the ring-shaped jig member having an inner peripheral surface slidably engageable with the outer peripheral surface of the nozzle body, an outer peripheral wrench-engagement part for being gripped by a second wrench, and a keyway formed the inner peripheral surface thereof and extending in an axial direction thereof, the keyway being slidably receptive of the key, the key being fittedly receivable in the key seat of the nozzle body; placing the key in the key seat of the nozzle body; setting the ring-shaped jig member on the nozzle body such that the keyway of the ring-shaped jig member is in sliding fit with the key placed in the key seat of the nozzle body; while the nozzle adaptor is held in a relatively non-rotatable state by gripping the wrench-engagement part of the nozzle adaptor with the first wrench, rotating the ring-shaped jig member and the nozzle body integrally in a screw-tightening direction by the second wrench with the wrench-engagement part of the jig member being gripped by the second wrench such that the threaded end portion of the nozzle body is caused to move into threaded engagement with the threaded end portion of the nozzle adaptor until the nozzle body is tightly fastened to the nozzle adaptor; and removing the ring-shaped jig member and the key in succession from the nozzle body. The nozzle body can be easily attached to and detached from the nozzle adaptor without using a large-sized special jig.

DETAILED DESCRIPTION OF THE PREFERRED EMBODIMENT

A certain preferred structural embodiment of the present invention will be described in detail below, by way of example only, with reference to the accompanying sheets of drawings.

Figure 1:
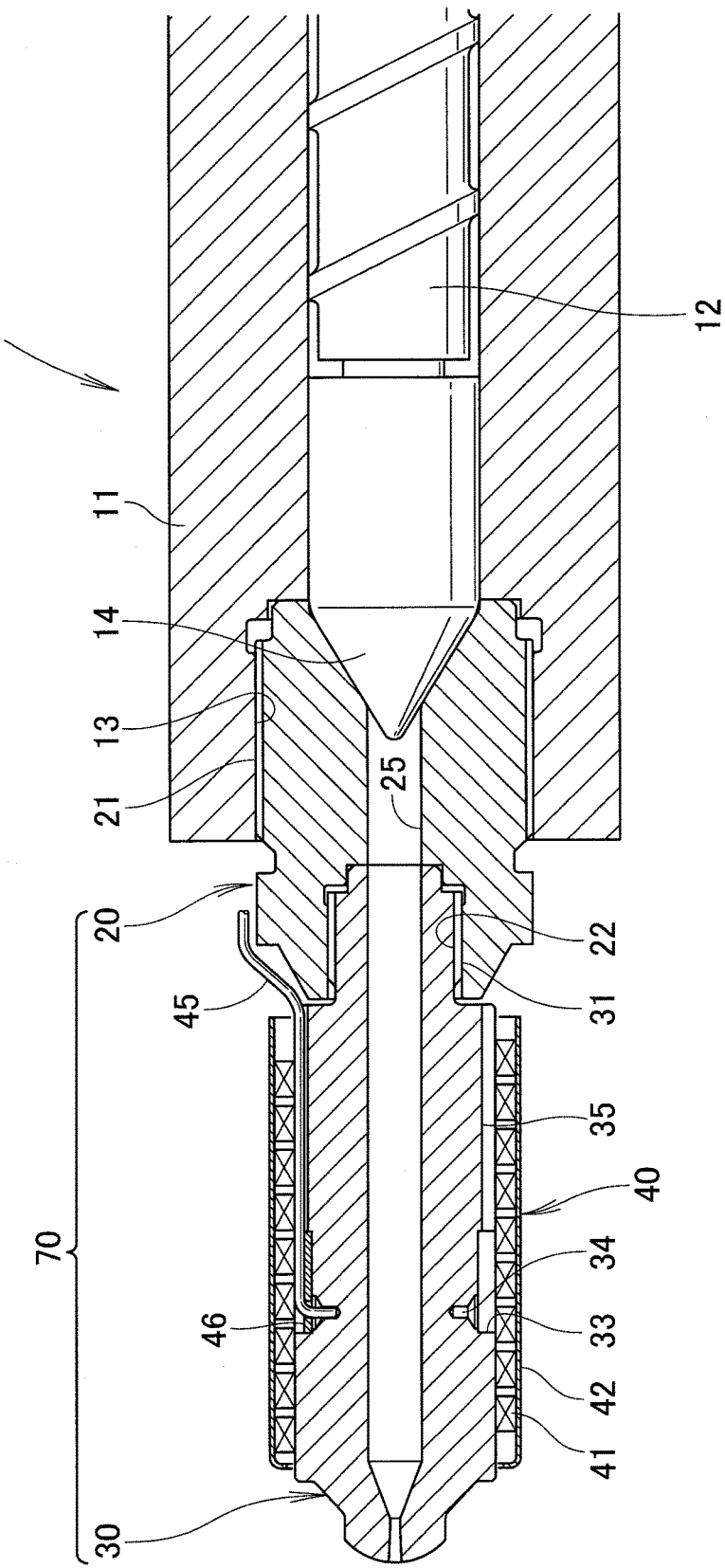
FIG. 1 is a cross-sectional view of a main part of an injection device according to an embodiment of the present invention.

As shown in FIG. 1, an injection device 10 includes a heating cylinder 11, a screw 12 rotatably received in the heating cylinder 11 and movable forward and backward in the heating cylinder 11, a nozzle adaptor 20 having an externally threaded part 21 threadedly engaged with an internally threaded part 13 of the heating cylinder 11 formed at a tip or front end 11 thereof, a nozzle body 30 having an externally threaded part 31 threadedly engaged with an internally threaded part 22 of the nozzle adaptor 20 formed in a tip or front end portion 20a thereof, a cylindrical heater 40 fitted over the nozzle body 30 for heating the nozzle body 30, and a thermocouple 45 for measuring a temperature of the nozzle body 30. The nozzle body 30 and the nozzle adaptor 20 together form a two-piece nozzle 70.

The cylindrical heater 40 includes a coiled heater element 41 having an inside diameter set so as to ensure that the coiled heater element 41 is mounted to be in close contact with an outer peripheral surface 30a of the nozzle body 30, and a heater case 42 made of metal and covering the coiled heater element 41.

Figure 2:
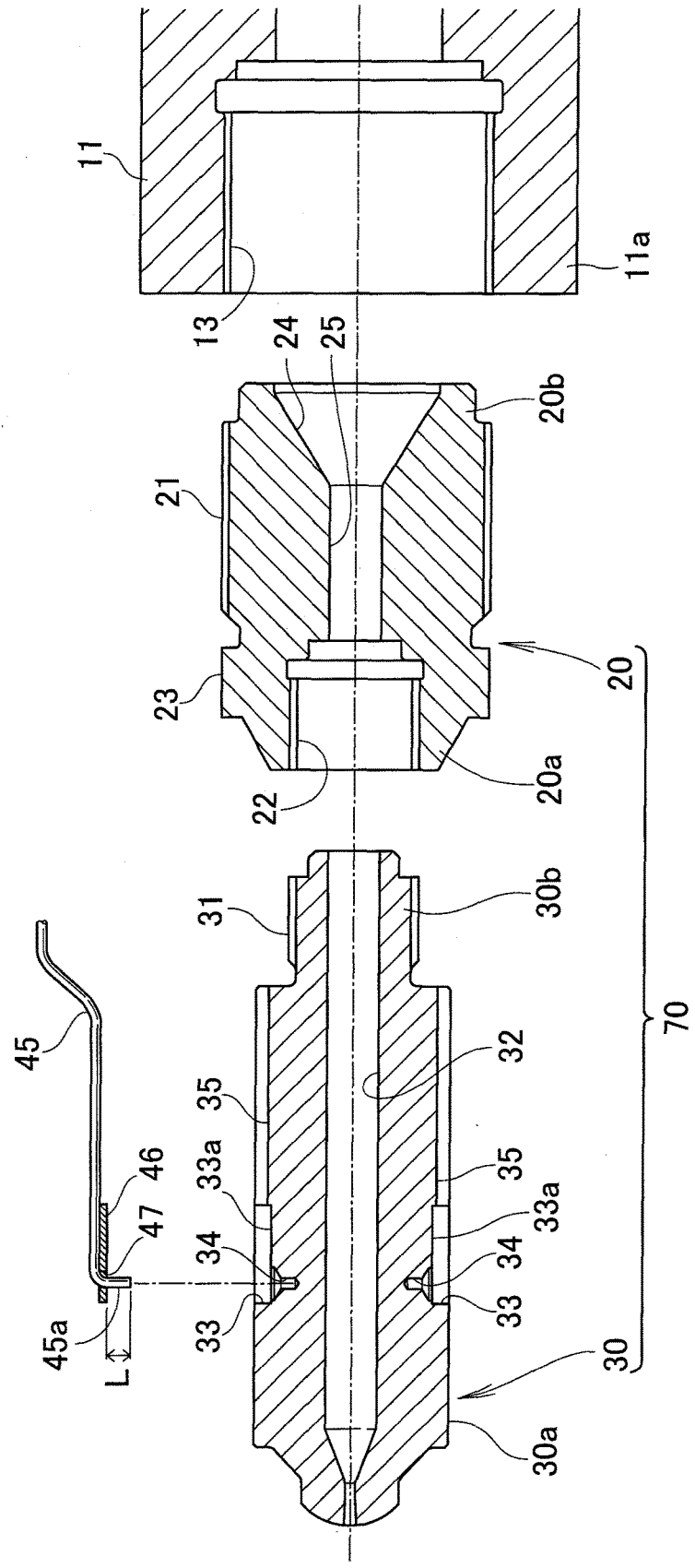
FIG. 2 is an exploded view of the main part of the injection device.

As shown in FIG. 2, the nozzle adaptor 20 is generally cylindrically shaped and has the externally threaded part 21 formed on a heel or rear end portion 20b thereof, an outer peripheral wrench-engagement part 23 located forwardly of the externally threaded part 21, and the internally threaded part 22 formed in the tip or front end portion 20a thereof in alignment with an axis of the cylindrical nozzle adaptor 20. The nozzle adaptor 20 also has an axial taper hole 24 formed in the rear end portion 20b thereof for receiving a tapered tip end 14 (FIG. 1) of the screw 12 (FIG. 1), and a flow channel 25 extending between the axial taper hole 24 and the internally threaded part 22 along the axis of the nozzle adaptor 20. The outer peripheral wrench-engagement part 23 may be formed into a hexagonal shape, octagonal shape, square shape, oblong shape with two parallel flat surfaces, or any other shape provided that the wrench-engagement part 23 can be held or gripped by an appropriate tightening tool, such as a wrench, spanner, or the like.

The nozzle body 30 is formed by machining a round steel bar and has the externally threaded part 31 formed on a heel or rear end portion 30b thereof, an axial central flow channel 32 extending throughout the length thereof, a pair of key seats 33, 33 formed on the outer peripheral surface 30a at equal intervals in a circumferential direction thereof and extending in an axial direction of the nozzle body 30. The nozzle body 30 further has an insertion hole 34 extending from a bottom 33a of each key seat 33 in a radial inward direction for receiving therein an end portion 45a of the thermocouple 45, and a longitudinal groove 35 formed in the outer peripheral surface 33a and extending continuously from an end of each key seat 33 in the axial direction toward the threaded rear end portion 30b of the nozzle body 30. Differing from the nozzle adaptor 20, the nozzle body 30 is not provided with a wrench-engagement part.

The thermocouple 45 is a sheathed thermocouple having a wire-like external appearance and has an elongated rectangular plate 46 provided on the end portion 45a thereof. The rectangular plate 46 has a small hole 47 formed therein. With the end portion 45a of the thermocouple 45 inserted through the small hole 47 in such a manner as to project from the rectangular plate 46 by a predetermined length L, the thermocouple 45 is fixed by welding (or brazing) to the elongated plate 46. The predetermined length L is corresponds to a depth of the insertion hole 34 of the nozzle body 30. A single thermocouple 45 is provided, and the number of key seats 33 and longitudinal grooves 35 is plural. When the thermocouple 45 is to be drawn in an upward direction, the thermocouple 45 is placed in one of the key seats 33 and a corresponding one of the longitudinal grooves 35, which are located at a higher position than the remaining key seats 33 and associated longitudinal grooves 35 when the nozzle body 30 has been threadedly attached to the nozzle adaptor 20. The rectangular plate 46 preferably has rounded opposite longitudinal ends. The rectangular plate 46 is complementary in shape to the key seats 33 so as to be fittedly receivable in the key seats 33. The longitudinal grooves 35 have a depth which is slightly larger than a maximum diameter or thickness of the thermocouple 45 and which is smaller than a depth of the key seats 33 by a distance corresponding to a thickness of the rectangular plate 46.

Figure 3:
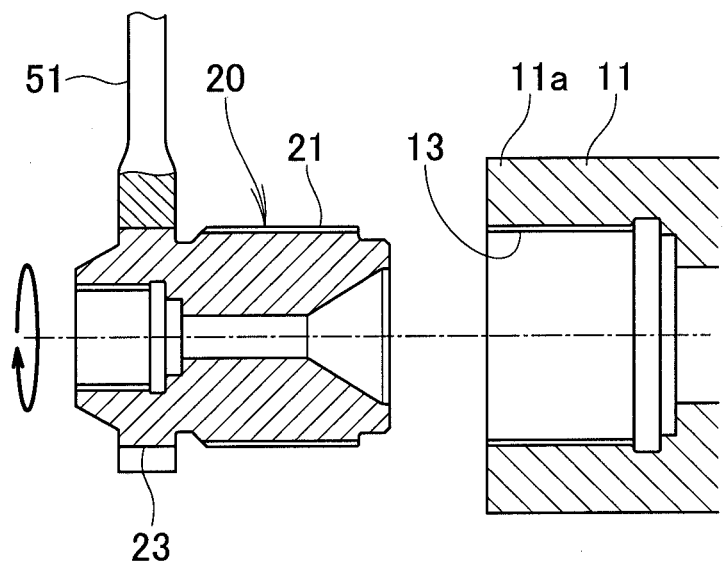
FIG. 3 is a cross-sectional view illustrative of the manner in which a nozzle adaptor is attached to the tip of a heating cylinder.

As shown in FIG. 3, with the wrench-engagement part 23 being firmly gripped by a wrench 51, the nozzle adaptor 20 is turned or rotated by the wrench 51 in a screw tightening direction so that the externally threaded part 21 of the nozzle adaptor 20 is brought into threaded engagement with the internally threaded part 13 of the heating cylinder 11. The nozzle adaptor 20 can thus be threadedly attached to the tip 11a of the heating cylinder 11. The wrench 51 may be a single open-end wrench (single open-end spanner), a double open-end wrench (double open-end spanner), a combination box and open-end wrench (combination spanner), a crescent wrench (adjustable spanner), a box end wrench (ring spanner), a flare nut wrench (flare nut spanner), a ratchet box end wrench (ratchet ring spanner), or a similar tightening tool. The nozzle adaptor 20 can be attached to and detached from the heating cylinder 11 without using a special tool but with the use of a general-purpose tool. The general-purpose tools do not need a special care about their storage place.

Figure 4:
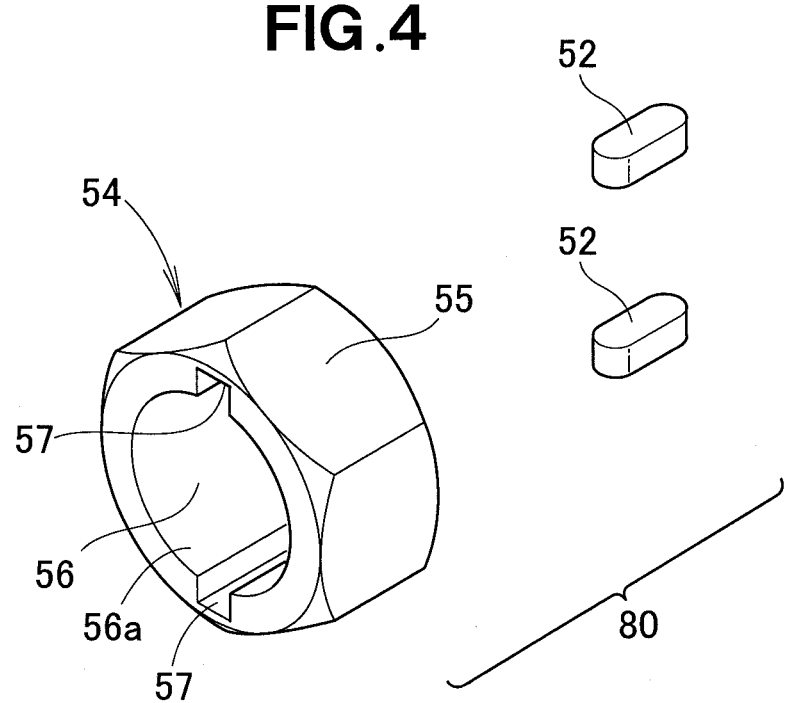
FIG. 4 is an exploded perspective view of a jig for use in assembling and disassembling a two-piece nozzle of the injection device, the jig being composed of a ring-shaped jig member and two parallel keys used in combination.

Next, a description will be made as to how the nozzle body 30 is attached to the nozzle adaptor 20. As a first step, a jig 80 for use in assembling and disassembling the two-piece nozzle 70 (FIG. 2) is provided. As shown in FIG. 4, the jig 80 is composed of a ring-shaped jig member 54 and a pair of parallel keys 52. The ring-shaped jig member 54 has an outer peripheral wrench-engagement part 55, a central hole 56 having an inside diameter slightly larger than an outside diameter of the nozzle body 30 (FIG. 2), and two diametrically opposed keyways 57, 57 formed in an inner peripheral surface 56a defining the central hole 56.

Likewise the wrench-engagement part 23 of the nozzle adaptor 20, the wrench-engagement part 55 of the ring-shaped jig member 54 may be formed into a hexagonal shape, octagonal shape, square shape, oblong shape with two parallel flat surfaces, or any other shape provided that the wrench-engagement part 55 can be held or gripped by an appropriate tightening tool, such as a wrench, spanner, or the like.

The ring-shaped jig member 54 may be produced from a round steel rod through cutting or machining processes. As an alternative, a commercially available hexagonal nut may be used as a blank for the ring-shaped jig member 54. In the latter case, a female screw thread of the commercially available nut is cut away or removed to thereby form a central hole 56 and, subsequently, two diametrically opposed keyways 57, 57 are formed in an inner peripheral surface 56a defining the central hole 56. A ring-shaped jig member 54 can thus be obtained. With the use of the commercially available hexagonal nut, a machining process for producing an outer peripheral wrench-engagement part 55 is no longer required and, hence, a considerable reduction in production cost can be achieved.

Figure 5:
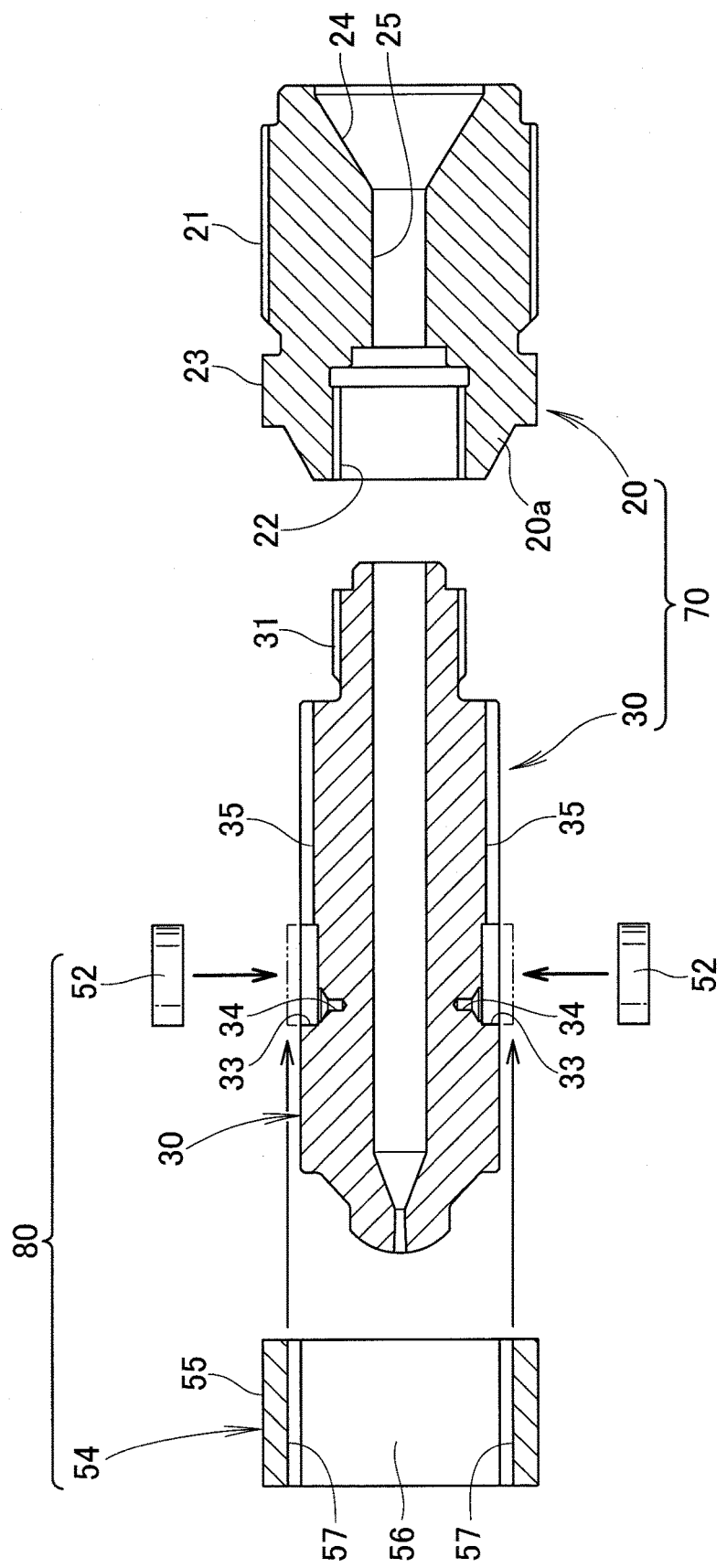
FIG. 5 is an exploded view illustrative of the manner in which a nozzle body is attached to the nozzle adaptor by using the jig of FIG. 4.

As a second step for assembling the two-piece nozzle 70 (FIG. 2), the parallel keys 52, 52 are placed into fitting engagement with the respective key seats 33, 33 of the nozzle body 30, as shown in FIG. 5. Then, the ring-shaped jig member 54 is slidably fitted over the nozzle body 30 as indicated by the arrows in FIG. 5 in such a manner that the parallel keys 52, 52 placed in the respective key seats 33, 33 are slidably received in the keyways 57, 57 of the ring-shaped jig member 54.

Figure 6:
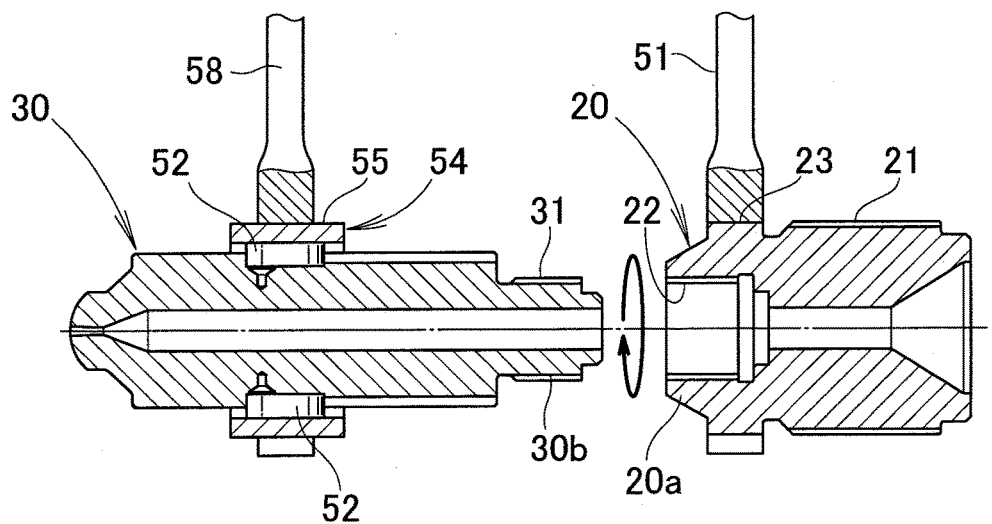
FIG. 6 is a cross-sectional view illustrative of the manner in which the nozzle body is threadedly fastened to the nozzle adaptor.
Figure 7:
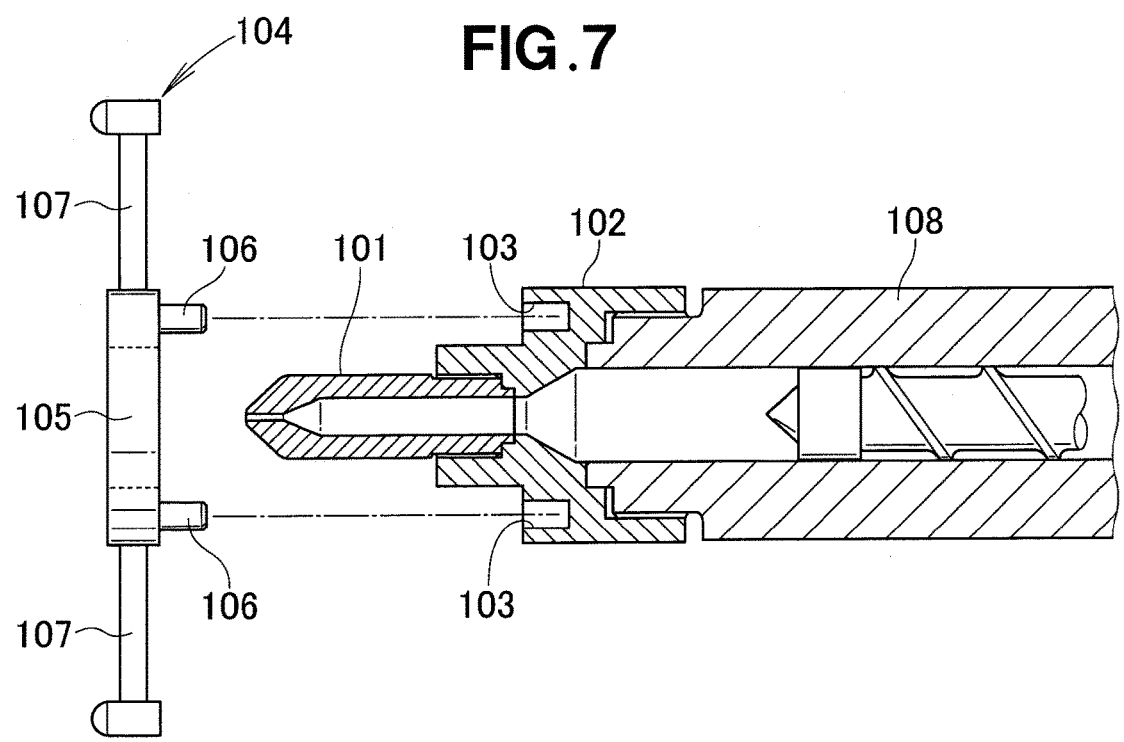
FIG. 7 is a cross-sectional view of a conventional heating cylinder head, explanatory of the manner in which a nozzle adaptor having a nozzle connected thereto is attached to the tip of a heating cylinder.

Subsequently, as shown in FIG. 6, the wrench-engagement part 23 of the nozzle adaptor 20 is gripped by a first wrench 51, and the wrench-engagement part 55 of the ring-shaped jig member 54, which is key coupled with the nozzle body 30, is gripped with a second wrench 58. The nozzle body 30 and the nozzle adaptor 20 are axially aligned with each other with their threaded end portions 30b, 20a arranged in a state of being adjacent to each other. While the nozzle adaptor 20 is held in a relatively non-rotatable state with the wrench-engagement part 23 being gripped by the first wrench 51, the ring-shaped jig member 54 and the nozzle body 30 key coupled with the ring-shaped jig member 54 are integrally turned or rotated in a screw-tightening direction by the second wrench 58 with the wrench-engagement part 55 being gripped by the second wrench 58 so that the threaded end portion 30b of the nozzle body 30 is caused to move into threaded engagement with the threaded end portion 20a of the nozzle adaptor 20. Integral rotation of the ring-shaped jig member 54 and the nozzle body 30 continues until the nozzle body 30 is tightly fastened to the nozzle adaptor 20 via threaded engagement between the respective threaded parts 31, 22.

Then, a grip on the wrench-engagement parts 23, 55 by the respective wrenches 51, 58 is released, and the ring-shaped jig member 54 and the parallel keys 52, 52 are removed in succession from the nozzle body 33 in a procedure opposite to the above.

Subsequently, the rectangular plate 46 shown in FIG. 2 is fitted in a selected one of the key seats 33 of the nozzle body 33, which is located at a higher position than another key seat 33, while the end portion 45a of the thermocouple 45 is inserted in the insertion hole 34 of the selected key seat 33. Thereafter, the thermocouple 45 is placed in the longitudinal groove 35 extending continuously from an end of the selected key seat 33. Then, the cylindrical heater 40 shown in FIG. 1 is fitted over the nozzle body 30 with the thermocouple 45 received in the selected key seat 33 and the associated longitudinal groove 35. With the cylindrical heater 40 thus mounted on the nozzle body 30, the thermocouple 45 is prevented from coming off from the selected key seat 33 or the associated longitudinal groove 35.

The longitudinal grooves 35 may be omitted when the thermocouple 45 is not needed. It is preferable that the wrench-engagement part 23 of the nozzle adaptor 20 and the wrench-engagement part 55 of the ring-shaped jig member 54 have the same size so that the first wrench 51 and the second wrench 58 can be used with compatibility.

The keys 52 may be substituted by woodruff keys (half-moon keys), or taper keys. However, the parallel keys 52 are preferable because they are readily available. The parallel keys 52 may be rounded at either one end or both ends thereof. Alternatively, the parallel keys 52 may have flat surfaces at opposite ends thereof. The shape and configuration of the keys can be arbitrarily selected. Furthermore, the cylindrical heater 40 having the coiled heater element 41 may be replaced by a band heater. The type of the heater can be arbitrarily selected.

The present invention is particularly suitable for application to an injection device in which frequent replacement of the nozzle is major requirement.

Obviously, various minor changes and modifications of the present invention are possible in the light of the above teaching. It is therefore to be understood that within the scope of the appended claims the invention may be practiced otherwise than as specifically described.

What is claimed is:

1. An injection device comprising:
a heating cylinder;
a two-piece nozzle comprising: a nozzle adaptor threadedly attached to a tip of the heating cylinder, the nozzle adaptor having an outer peripheral wrench-engagement part configured to be gripped by a wrench; and a nozzle body threadedly attached to a tip of the nozzle adaptor, the nozzle body having a key seat formed in an outer peripheral surface thereof and extending in an axial direction thereof, an insertion hole extending from a bottom of the key seat, and a longitudinal groove formed in the outer peripheral surface and extending continuously from an end of the key seat in the axial direction;
a thermocouple for measuring a temperature of the nozzle body, the thermocouple being received in the key seat and the longitudinal groove of the nozzle body; and
a heater fitted over the nozzle body for heating the nozzle body and serving as a stopper that prevents the thermocouple from coming off from the key seat and the longitudinal groove of the nozzle body;
wherein the insertion hole of the nozzle body extends in a radial inward direction of the nozzle body, the longitudinal groove of the nozzle body has a depth smaller than a depth of the key seat, and the thermocouple has an end portion inserted in the insertion hole.

2. The injection device according to claim 1, wherein the heater comprises a cylindrical heater.

3. The injection device according to claim 2, wherein the thermocouple includes a rectangular plate fixed to the end portion thereof, the rectangular plate being fitted in the key seat.

4. An injection device comprising:
a heating cylinder;
a two-piece nozzle comprising: a nozzle adaptor threadedly attached to a tip of the heating cylinder, the nozzle adaptor having an outer peripheral wrench-engagement part configured to be gripped by a wrench; and a nozzle body threadedly attached to a tip of the nozzle adaptor, the nozzle body having a key seat formed in an outer peripheral surface thereof and extending in an axial direction thereof, an insertion hole extending from a bottom of the key seat, and a longitudinal groove formed in the outer peripheral surface and extending continuously from an end of the key seat in the axial direction;
a thermocouple for measuring a temperature of the nozzle body, the thermocouple being received in the key seat and the longitudinal groove of the nozzle body; and
a heater fitted over the nozzle body for heating the nozzle body and serving as a stopper that prevents the thermocouple from coming off from the key seat and the longitudinal groove of the nozzle body;
wherein the thermocouple has an end portion inserted in the insertion hole of the nozzle body and a rectangular plate fixed to the end portion and fitted in the key seat.

5. The injection device according to claim 4, wherein the end portion of the thermocouple extends through a hole in the rectangular plate and into the insertion hole of the nozzle body.

6. An injection device comprising:
a heating cylinder;
a two-piece nozzle comprising: a nozzle adaptor threadedly attached to a tip of the heating cylinder, the nozzle adaptor having an outer peripheral wrench-engagement part configured to be gripped by a wrench; and a nozzle body threadedly attached to a tip of the nozzle adaptor, the nozzle body having a key seat formed in an outer peripheral surface thereof and extending in an axial direction thereof, an insertion hole extending from a bottom of the key seat, and a longitudinal groove formed in the outer peripheral surface and extending continuously from an end of the key seat in the axial direction;
a thermocouple for measuring a temperature of the nozzle body, the thermocouple being received in the key seat and the longitudinal groove of the nozzle body; and
a heater fitted over the nozzle body for heating the nozzle body and serving as a stopper that prevents the thermocouple from coming off from the key seat and the longitudinal groove of the nozzle body;
wherein a depth of the longitudinal groove from the outer peripheral surface of the nozzle body is smaller than a depth of the key seat from the outer peripheral surface of the nozzle body.

7. An injection device comprising:
a heating cylinder;
a nozzle adaptor attached to an end of the heating cylinder;
a nozzle body attached to an end of the nozzle adaptor, the nozzle body having an outer peripheral surface and a key seat formed in the outer peripheral surface and extending in an axial direction of the nozzle body;
a heater for heating the nozzle body; and
a thermocouple for measuring a temperature of the nozzle body, the thermocouple including a plate fitted in the key seat of the nozzle body;
wherein the nozzle body has a longitudinal groove formed in the outer peripheral surface and extending continuously from an end of the key seat in the axial direction, the thermocouple being received in the longitudinal groove of the nozzle body; and wherein a depth of the longitudinal groove from the outer peripheral surface of the nozzle body is smaller than a depth of the key seat from the outer peripheral surface of the nozzle body.

8. The injection device according to claim 7, wherein the nozzle body has an insertion hole extending from a bottom of the key seat; and wherein the thermocouple has an end portion extending through the plate and into the insertion hole of the nozzle body.

9. The injection device according to claim 7, wherein the heater is fitted over the nozzle body so as to prevent the thermocouple from coming off from the key seat and the longitudinal groove of the nozzle body.

10. The injection device according to claim 7, wherein the heater is fitted over the nozzle body so as to prevent the thermocouple from coming off from the key seat of the nozzle body.

11. An injection device comprising:
a heating cylinder;
a two-piece nozzle comprising:
   a nozzle adaptor attached to an end of the heating cylinder; and
   a nozzle body attached to an end of the nozzle adaptor, the nozzle body having a key seat formed in an outer peripheral surface thereof and extending in an axial direction thereof, an insertion hole extending from a bottom of the key seat, and a longitudinal groove formed in the outer peripheral surface and extending continuously from an end of the key seat in the axial direction;
a thermocouple for measuring a temperature of the nozzle body, the thermocouple being received in the key seat and the longitudinal groove of the nozzle body; and
a heater fitted over the nozzle body for heating the nozzle body and serving as a stopper that prevents the thermocouple from coming off from the key seat and the longitudinal groove of the nozzle body;
wherein a depth of the longitudinal groove from the outer peripheral surface of the nozzle body is smaller than a depth of the key seat from the outer peripheral surface of the nozzle body.

12. The injection device according to claim 11, wherein the thermocouple includes a plate fixed to an end portion thereof, the plate being fitted in the key seat of the nozzle body.

13. The injection device according to claim 12, wherein the end portion of the thermocouple extends through the plate and into the insertion hole of the nozzle body.

14. The injection device according to claim 11, wherein the nozzle adaptor is threadedly attached to the end of the heating cylinder; and wherein the nozzle body is threadedly attached to the end of the nozzle adaptor.

15. The injection device according to claim 11, wherein the nozzle adapter, but not the nozzle body, has an outer peripheral wrench-engagement part configured to be gripped by a wrench.

\* \* \* \* \*